(12) United States Patent
Jo et al.

(10) Patent No.: US 12,415,380 B2
(45) Date of Patent: Sep. 16, 2025

(54) WHEEL AND MOBILITY INCLUDING THE SAME

(71) Applicants: Hyundai Motor Company, Seoul (KR); Kia Corporation, Seoul (KR); MOBINN Inc., Suwon-si (KR)

(72) Inventors: Sun Myoung Jo, Ansan-si (KR); Jin Choi, Seoul (KR); Hoon Chung, Hwaseongsi (KR)

(73) Assignees: Hyundai Motor Company, Seoul (KR); Kia Corporation, Seoul (KR); Mobinn Inc., Suwon-si (KR)

( * ) Notice: Subject to any disclaimer, the term of this patent is extended or adjusted under 35 U.S.C. 154(b) by 573 days.

(21) Appl. No.: 17/890,333

(22) Filed: Aug. 18, 2022

(65) Prior Publication Data
US 2023/0331038 A1    Oct. 19, 2023

(30) Foreign Application Priority Data

Apr. 14, 2022 (KR) .......................... 10-2022-0046378

(51) Int. Cl.
*B60B 9/10* (2006.01)
*B60B 9/26* (2006.01)
*B60C 7/14* (2006.01)

(52) U.S. Cl.
CPC .................. *B60B 9/10* (2013.01); *B60B 9/26* (2013.01); *B60C 7/146* (2021.08)

(58) Field of Classification Search
CPC .............. B60B 9/10; B60B 9/26; B60C 7/146
See application file for complete search history.

(56) References Cited

U.S. PATENT DOCUMENTS

| | | | | |
|---|---|---|---|---|
| 1,166,697 A * | 1/1916 | Likely | ..................... | B60B 9/005 152/79 |
| 1,229,618 A * | 6/1917 | Hunter | ..................... | B60B 9/26 301/43 |
| 1,292,345 A * | 1/1919 | Martin | ..................... | B60B 9/10 152/52 |
| 1,353,731 A * | 9/1920 | Diskin | ..................... | B60B 9/06 152/88 |
| 3,610,652 A * | 10/1971 | Moore | .................. | B60G 99/00 280/80.1 |

(Continued)

FOREIGN PATENT DOCUMENTS

CN     212022191 U     11/2020
EP     0607892 A1 *   7/1994
(Continued)

*Primary Examiner* — Kip T Kotter
(74) *Attorney, Agent, or Firm* — Banner & Witcoff, Ltd.

(57) ABSTRACT

A mobile apparatus is provided. The mobile apparatus may include: a body including a material of which a shape is reversibly deformable; a first link rotatably coupled to the body; a second link having one side rotatably coupled to the first link and the other side rotatably coupled to the body; a first shaft provided in a region, in which the first link is rotatably coupled to the body, and inserted into the first link and the body; a second shaft provided in a region, in which the second link is rotatably coupled to the first link, and inserted into the first link and the second link; and a third shaft provided in a region, in which the second link is rotatably coupled to the body, and inserted into the second link and the body.

20 Claims, 7 Drawing Sheets

(56) References Cited

U.S. PATENT DOCUMENTS

| | | | |
|---|---|---|---|
| 2010/0024934 A1* | 2/2010 | Khajepour | B60B 9/06 152/17 |
| 2011/0278911 A1* | 11/2011 | Funaki | B60B 9/00 301/62 |
| 2020/0276865 A1 | 9/2020 | Jo et al. | |
| 2022/0388339 A1 | 12/2022 | Jo et al. | |

FOREIGN PATENT DOCUMENTS

| | | |
|---|---|---|
| JP | 2010143344 A | 7/2010 |
| KR | 102107597 B1 | 5/2020 |
| KR | 10-2020-0062695 A | 6/2020 |
| KR | 10-2020-0105131 A | 9/2020 |
| KR | 10-2021-0096506 A | 8/2021 |
| KR | 10-2021-0144073 A | 11/2021 |
| KR | 10-2022-0163785 A | 12/2022 |
| WO | 2018-216250 A1 | 11/2018 |

* cited by examiner

WHEEL AND MOBILITY INCLUDING THE SAME

CROSS-REFERENCE TO RELATED APPLICATION(S)

The present application claims priority from and the benefit of Korean Patent Application No. 10-2022-0046378, filed on Apr. 14, 2022, which is hereby incorporated by reference for all purposes.

TECHNICAL FIELD

The present disclosure relates to a wheel and a mobility including the wheel.

BACKGROUND

As the demands for mobile apparatuses including new types of transportation means such as delivery robots increase, research on wheels mounted on the mobile apparatuses is also being actively conducted. In particular, there are increasing demands for wheels capable of traveling smoothly while conforming to the ground or obstacles that face the mobile apparatus during the traveling of the mobile apparatus.

For example, in order for the wheels to be mounted on such a mobile apparatus, each of the wheels has to be able to travel while stably supporting the mobile apparatus on a flat ground. In addition, when the mobile apparatus encounters stairs or obstacles while traveling, the shape of the wheel should be deformable in response to the shape of the stairs or obstacles. Thus, the wheel can easily climb up and down the stairs and pass over the obstacles smoothly. For this, it is preferable to apply, to the wheel, an elastic material of which the shape can be reversibly deformed by an external force.

Some wheels may have an elastic material. Accordingly, such a wheel may be twisted in the width direction during the turning motion of the wheel. This acts as a factor that adversely affects the durability of the wheel, and consequently deteriorates the traveling performance of the mobile apparatus.

SUMMARY

The following summary presents a simplified summary of certain features. The summary is not an extensive overview and is not intended to identify key or critical elements.

Aspects of the present disclosure may relate to wheels. The wheel may comprise: a body comprising a material of which a shape is reversibly deformable; a first link rotatably coupled to the body; a second link having one side rotatably coupled to the first link and the other side rotatably coupled to the body; a first shaft disposed in a region, in which the first link is rotatably coupled to the body, and inserted into the first link and the body; a second shaft disposed in a region, in which the second link is rotatably coupled to the first link, and inserted into the first link and the second link; and a third shaft disposed in a region, in which the second link is rotatably coupled to the body, and inserted into the second link and the body.

Further aspects of the present disclosure may relate to mobile apparatuses. The mobile apparatuses may comprise a wheel and a frame to which the wheel may be coupled. The wheel may comprise: a body comprising a material of which a shape is reversibly deformable; a first link rotatably coupled to the body; a second link having one side rotatably coupled to the first link and the other side rotatably coupled to the body; a first shaft disposed in a region, in which the first link is rotatably coupled to the body, and inserted into the first link and the body; a second shaft disposed in a region, in which the second link is rotatably coupled to the first link, and inserted into the first link and the second link; and a third shaft disposed in a region, in which the second link is rotatably coupled to the body, and inserted into the second link and the body.

These and other features and advantages are described in greater detail below.

BRIEF DESCRIPTION OF THE DRAWINGS

The accompanying drawings, which are included to provide a further understanding of the present disclosure, illustrate aspects of the present disclosure and, together with the description, serve to explain the principles of the present disclosure.

DETAILED DESCRIPTION

A wheel and a mobile apparatus according to the present disclosure will be described with reference to the drawings.

Figure 1:
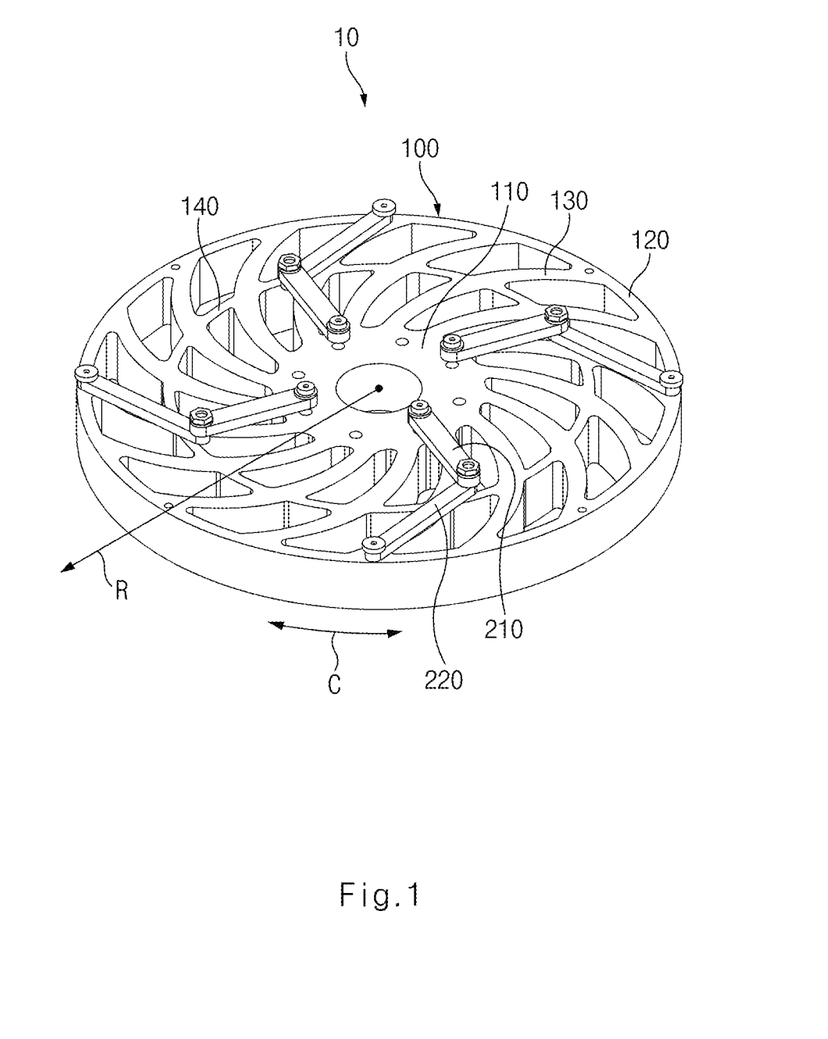
FIG. 1 is a perspective view illustrating a wheel according to the present disclosure.

FIG. 1 is a perspective view illustrating a wheel according to the present disclosure. Referring to FIG. 1, a wheel 10 according to the present disclosure may include a body unit 100. The body unit 100 may include a material, of which, a shape may be reversibly deformable. The body unit 100 may be referred to as a body or a body of a wheel. The body unit 100 may be a single component made of one material. For example, the body unit 100 may be made of a rubber material. The shape of the body unit 100 may be reversibly deformed as described herein. Accordingly, the shape may be deformed if an external force is applied thereto, but the shape may be restored to the original state if the external force is removed. Thus, the shape of the body unit 100 may be deformed to conform to the shapes of the ground or stairs when the body unit 100 receives an external force from the ground or stairs during traveling of the wheel 10. The wheel 10 and a mobile apparatus (e.g., vehicles, robots, etc.), which may include, for example, an apparatus that is designed and constructed so as to be moveable from place to place but may not include a portable apparatus (e.g., mobile phone), provided with the wheel 10 may be stably supported while the wheel is deformed.

The wheel 10 may include: a first link member 210 rotatably coupled to the body unit 100; and a second link member 220 having one side rotatably coupled to the first link member 210 and the other side rotatably coupled to the body unit 100. A link member (e.g., the first link member 210, the second link member 220, etc.) may be referred to as a link. Multiple first link members 210 and second link members 220 may be provided on a single body unit 100. According to aspects having multiple first link members 210 and second link members 220, the first link members 210 and the second link members 220 may be equidistantly spaced apart from each other in a circumferential direction C of the body unit 100.

Figure 2:
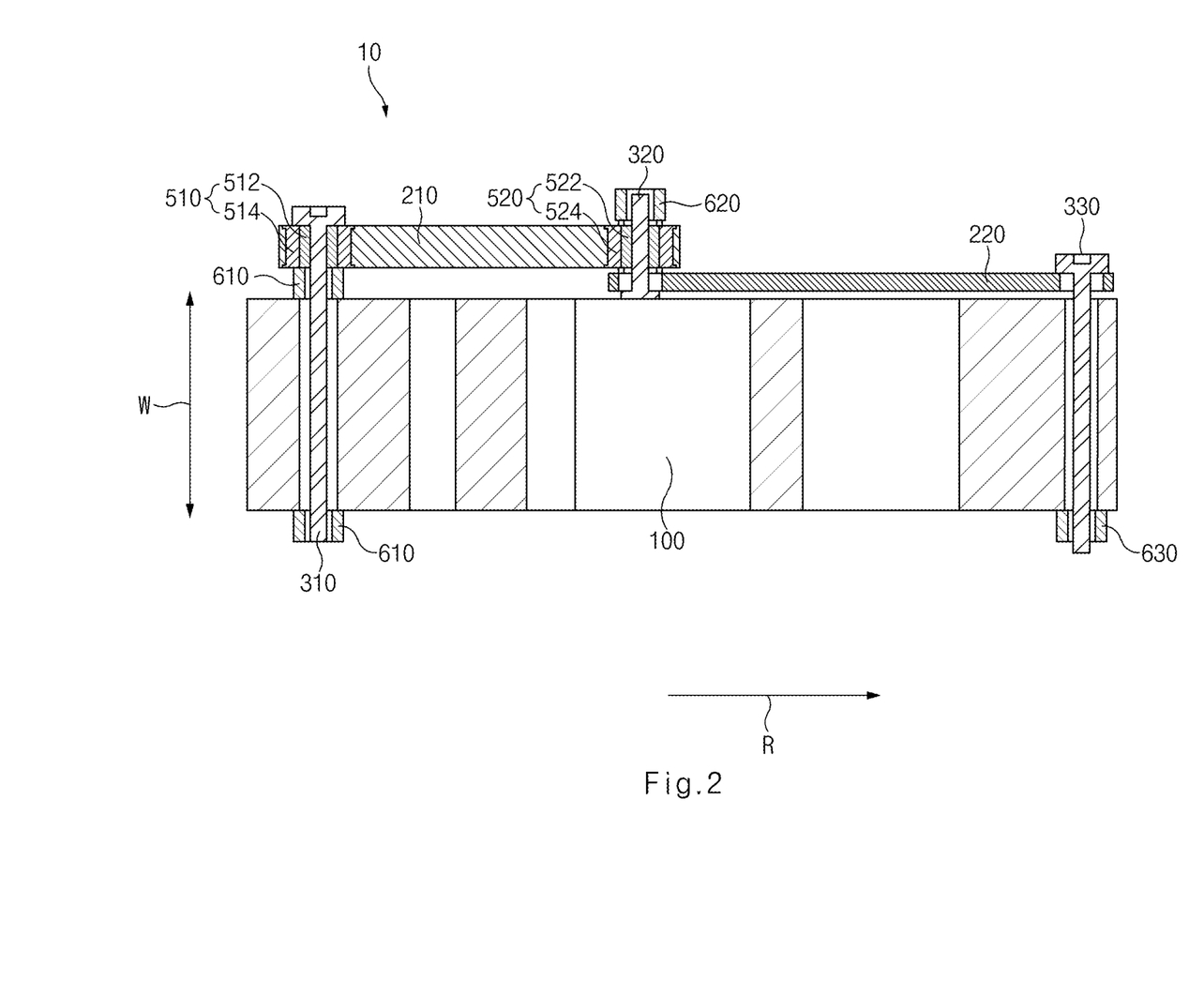
FIG. 2 is a cross-sectional view illustrating a wheel according to the present disclosure.

FIG. 2 is a cross-sectional view illustrating a wheel according to the present disclosure. Referring to FIG. 2, the first link member 210 and the second link member 220 may be provided on one side of the body unit 100 and face the body unit 100 in a width direction W. Therefore, the first link member 210 and the second link member 220 may support the body unit 100 in the width direction W.

If the wheel 10 turns left or right while traveling, the body unit 100 may be twisted in the width direction W of the body unit 100. In this case, the traveling performance may be significantly deteriorated during the turning motion of the wheel 10, for example, based on the torsion of the body unit 100. Also, the body unit 100 may be damaged when the twisting of the body unit 100 is severe. However, according to the present disclosure, the first link member 210 and the second link member 220 may support the body unit 100 in the width direction W, and thus, it is possible to minimize the twisting of the body unit 100 even during the turning motion.

Still referring FIG. 2, the wheel 10 according to the present disclosure may further include a plurality of shafts (e.g., a plurality of rotary shafts). The plurality of shafts may include a first rotary shaft 310. The first rotary shaft 310 may be provided in a region in which the first link member 210 is rotatably coupled to the body unit 100. The first rotary shaft 310 may be inserted into each of the first link members 210 and the body unit 100. The wheel 10 may further include a second rotary shaft 320 provided in a region, in which the second link member 220 is rotatably coupled to the first link member 210. A second rotary shaft 320 may be inserted into each of the first link members 210 and the second link members 220. The wheel 10 may further include a third rotary shaft 330 provided in a region in which the second link member 220 is rotatably coupled to the body unit 100. The third rotary shaft 330 may be inserted into each of the second link members 220 and the body unit 100.

According to aspects of the present disclosure, the first link member 210 may be provided inward from the second link member 220 in a radial direction of the body unit 100. Therefore, if an external force is applied to the inside of the body unit 100 in the radial direction R while the wheel 10 travels, the second link member 220, which is positioned relatively further outside in the radial direction R than the first link member 210, may receive the external force from the body unit 100 and may rotate relative to the first link member 210. The rotation of the second link member 220 will be described later.

Figure 6:
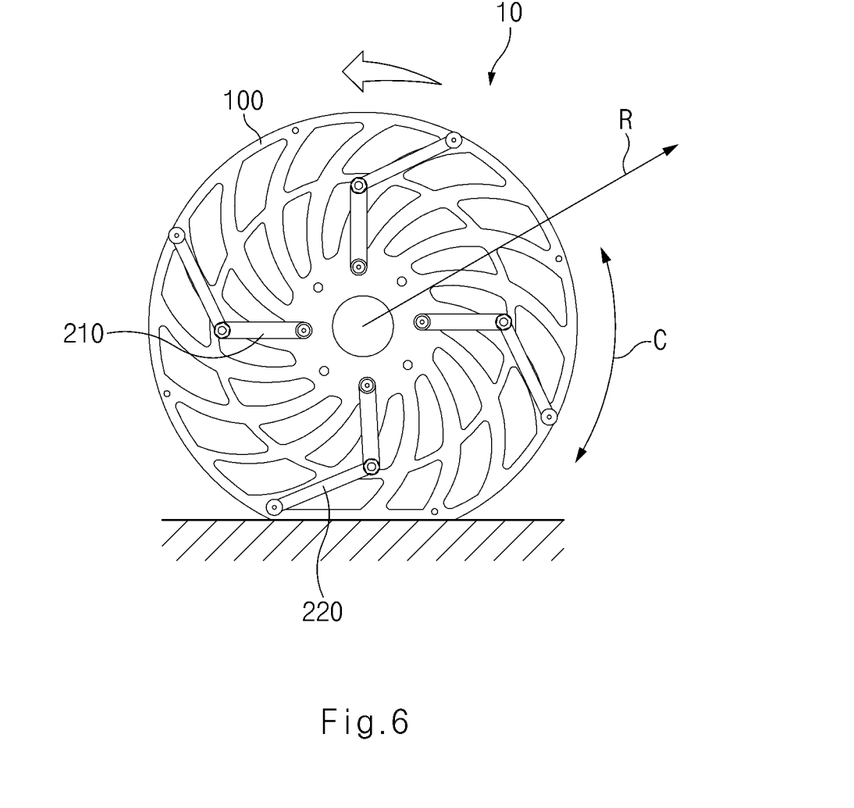
FIG. 6 is a view illustrating a state in which a wheel according to the present disclosure may travel along the ground.
Figure 7:
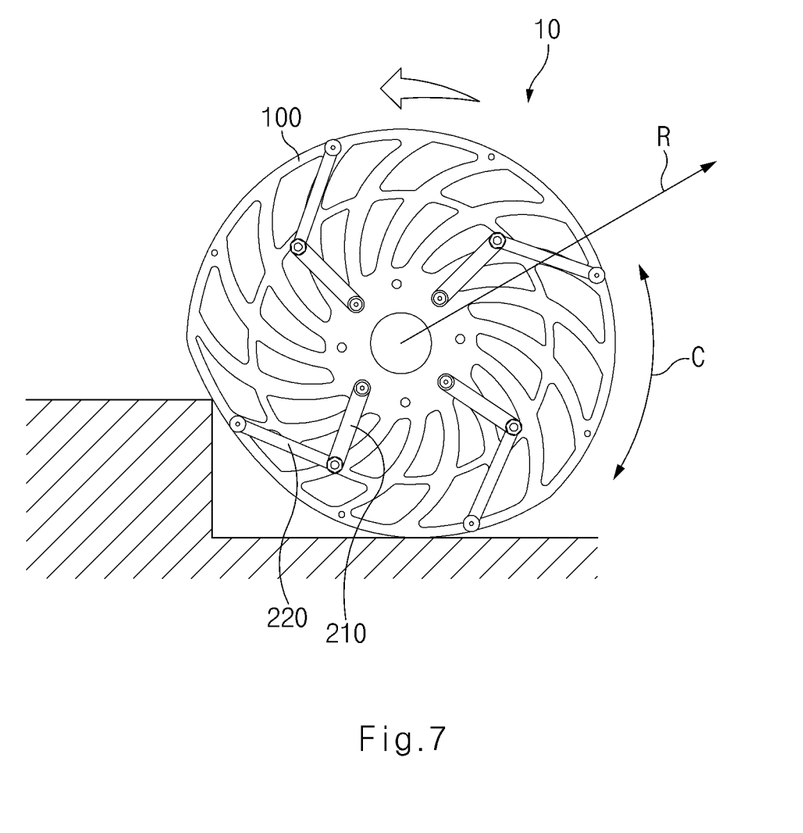
FIG. 7 is a view illustrating a state in which a wheel according to the present disclosure may travel on stairs.

FIG. 6 is a view illustrating a state in which a wheel according to the present disclosure may travel along the ground, and FIG. 7 is a view illustrating a state in which a wheel according to the present disclosure may travel on stairs.

As illustrated in FIGS. 6 and 7, when the body unit 100 is deformed while the wheel 10 travels, the second link member 220, which may be positioned in a deformed region of the body unit 100, may rotate while conforming to the deformed shape of the body unit 100. FIGS. 6 and 7 illustrate an example state in which, when the body unit 100 is deformed while the wheel 10 travels, the second link member 220, which may be positioned at a place corresponding to the deformed region of the body unit 100, may rotate inward in the radial direction R of the body unit 100. Accordingly, the first link member 210 and the second link member 220 may stably support the body unit 100 in the width direction W, but may not affect the shape deformation of the body unit 100 in the radial direction R due to an external force applied to the wheel 10 while it travels.

As described above, the first link member 210 may be provided inward from the second link member 220 in the radial direction of the body unit 100. Therefore, the first rotary shaft 310 may be provided inward from the second rotary shaft 320 in the radial direction R of the body unit 100, and the second rotary shaft 320 may be provided inward from the third rotary shaft 330 in the radial direction R.

Also, according to aspects of the present disclosure, the first rotary shaft 310, the second rotary shaft 320, and the third rotary shaft 330, which are described above, may be provided in parallel to each other, and the first rotary shaft 310, the second rotary shaft 320, and the third rotary shaft 330 may be provided perpendicular to the radial direction of the body unit 100. Therefore, a plane including a trajectory along which the first link member 210 rotates, and a plane including a trajectory along which the second link member 220 rotates, may be parallel to the radial direction R and the circumferential direction C of the body unit 100.

Referring again to FIG. 2, according to aspects herein, the first link member 210 and the second link member 220 may be spaced apart from the body unit 100 in the width direction W of the body unit 100. This may assist with the following advantages. In the case where the body unit 100 is twisted beyond a certain range (e.g., when the wheel 10 turns), the first link member 210 and the second link member 220 may support the body unit 100. However, before the body unit 100 is twisted beyond the certain range (e.g., when the wheel 10 travels in a straight direction), the first link member 210 and the second link member 220 may not interfere with the body unit 100.

According to examples of the present disclosure and as illustrated in FIG. 2, the distance between the first link member 210 and the body unit 100 may be greater than the distance between the second link member 220 and the body unit 100. This may be understood as indicating that the first link member 210 is biased further outward in the width direction W of the body unit 100 than the second link member 220.

During the traveling of the wheel 10, an external force may be applied to the outermost surface in the radial direction R of the body unit 100. Thus, a greater load due to such an external force may be applied to the second link member 220, which may be provided relatively outside in the radial direction R, than the first link member 210, which may be provided relatively inside in the radial direction R. Therefore, according to aspects herein, the second link member 220 may be located relatively closer to the body unit 100 in the width direction W than the first link member 210. Accordingly, a moment arm between a point, at which the external force is directly applied to the wheel 10, and the second link member 220 may be minimized.

Figure 4:
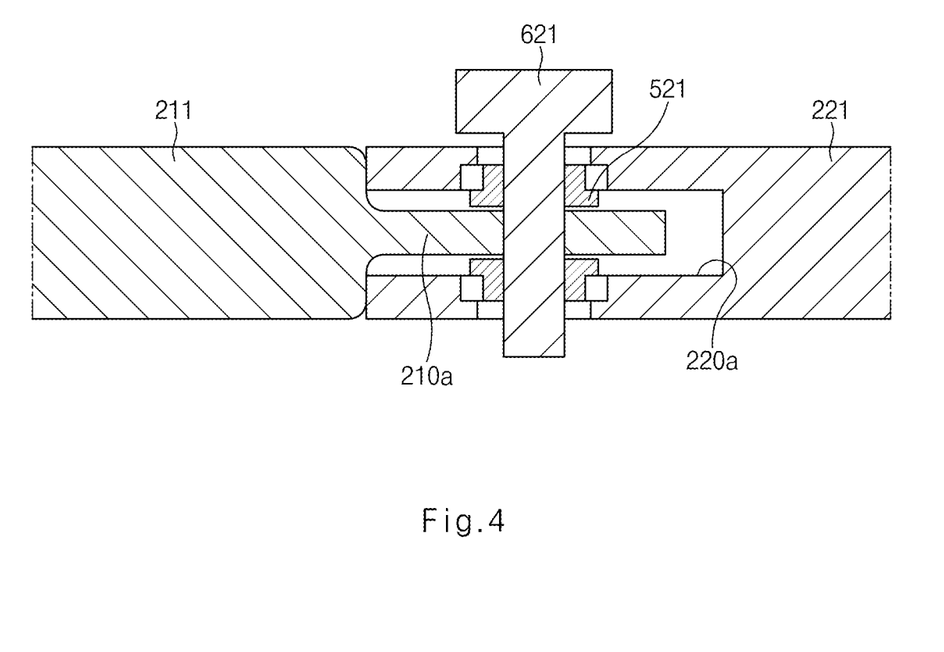
FIG. 4 is a cross-sectional view illustrating another example of a coupling structure in a wheel according to the present disclosure.

Alternatively, the distance between a first link member 211 and body unit 100 may be substantially the same. FIG. 4 is a cross-sectional view illustrating another example of a coupling structure in a wheel according to the present disclosure. Referring to FIG. 4 the distance between a first link member 211 and body unit 100 may be substantially the same as or correspond to the distance between a second link member 221 and a body unit 100. According to such aspects, in a region in which a second rotary shaft (e.g., second rotary shaft 621) passes through the first link member 211 and the second link member 221, the first link member 211 may be inserted into the second link member 221. In this case, a coupling structure between the first link member 211 and the second link member 221 may be symmetrical with respect to the width direction W of the body unit 100.

More specifically, as illustrated in FIG. 4, a protrusion region 210a, which may protrude from the first link member 211 toward the second link member 221, and through which the second rotary shaft 621 may pass, may be formed in the first link member 211. Additionally, a recess region 220a, which may be recessed in the direction away from the first link member 211, and through which the second rotary shaft 621 may pass, may be formed in the second link member 221. Here, the protrusion region 210a may be inserted into the recess region 220a. However, unlike the configuration illustrated in FIG. 4, in a region, in which a second rotary shaft 621 may pass through a first link member 211 and a second link member 221, the second link member 221 may additionally or alternatively be inserted into the first link member 211.

Figure 5:
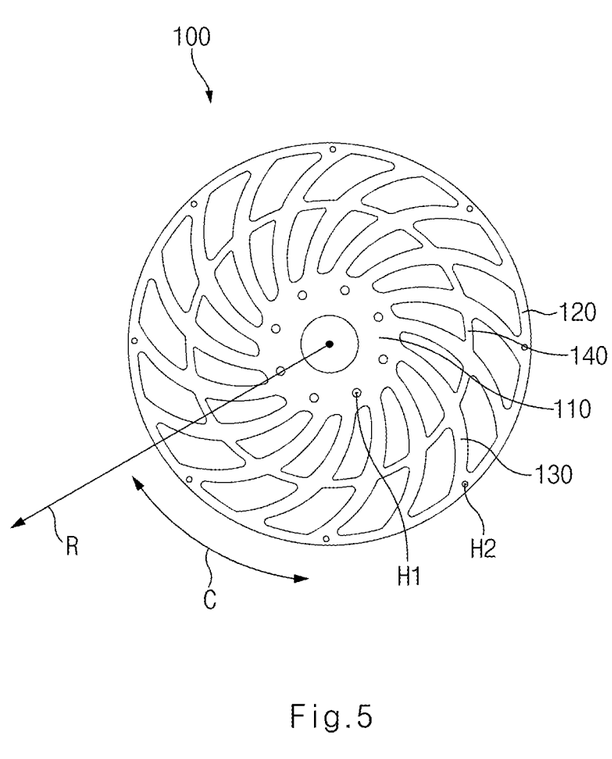
FIG. 5 is a plane view illustrating a body unit provided in a wheel according to the present disclosure.

FIG. 5 is a plane view illustrating a body unit 100 provided in a wheel 100 according to the present disclosure. Referring to FIG. 5, a first body through-hole H1, into which the first rotary shaft 310 may be inserted, and to which the first rotary shaft 310 may be coupled may be formed in the body unit 100. Additionally, a second body through-hole H2, into which the third rotary shaft 330 may be inserted, and to which the third rotary shaft 330 may be coupled, may be formed in the body unit 100.

Figure 3:
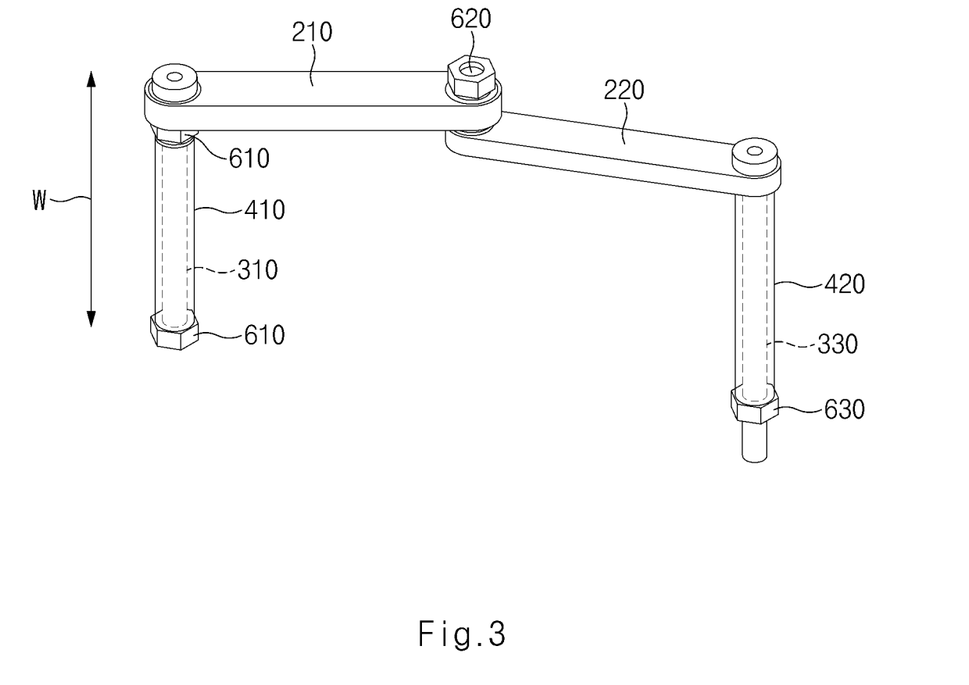
FIG. 3 is a perspective view illustrating a coupling structure in a wheel according to the present disclosure.

Referring to FIG. 3, the wheel 10 according to the present disclosure may further include a first spacer 410 which may be inserted into, and coupled to, the first body through-hole H1 to accommodate the first rotary shaft 310. Additionally, and a second spacer 420 which may be inserted into, and coupled to, the second body through-hole H2 to accommodate the third rotary shaft 330. Further, each of the first spacer 410 and the second spacer 420 may be coupled and fixed to the body unit 100.

The first spacer 410 may be configured to prevent the first rotary shaft 310 inside the first body through-hole H1 from directly contacting the body unit 100, and the second spacer 420 may be configured to prevent the third rotary shaft 330 inside the second body through-hole H2 from directly contacting the body unit 100.

Referring now to FIG. 2, the wheel 10 according to the present disclosure may further include a first bearing 510 which may be provided in a region, in which the first rotary shaft 310 may pass through the first link member 210. First bearing 510 may be accommodated inside the first link member 210, and the first rotary shaft 310 may pass through the first bearing 510. Additionally, the wheel 10 according to the present disclosure may further include a second bearing 520 which may be provided in a region, in which the second rotary shaft 320 may pass through the first link member 210. The second bearing 520 may be accommodated inside the first link member 210, and the second rotary shaft 320 may pass through the second bearing 520. The first bearing 510 may be configured to support the first rotary shaft 310 so that the relative rotation between the first link member 210 and the first rotary shaft 310 occurs smoothly, and the second bearing 520 may be configured to support the second rotary shaft 320 so that the relative rotation between the first link member 210 and the second rotary shaft 320 occurs smoothly.

Further, as illustrated in FIG. 2, the first bearing 510 may include: a first bearing inner race 512 which may be coupled and fixed to the first rotary shaft 310; and a first bearing outer race 514 which may be provided on the outside of the first bearing inner race 512 and may be coupled and fixed to the first link member 210. Also, the second bearing 520 may include: a second bearing inner race 522 which may be coupled and fixed to the second rotary shaft 320; and a second bearing outer race 524 which may be provided on the outside of the second bearing inner race 522 and coupled and fixed to the first link member 210. Therefore, the first rotary shaft 310 may be supported by the first bearing 510 so as to be rotatable relative to the first link member 210, and the second rotary shaft 320 may be supported by the second bearing 520 so as to be rotatable relative to the first link member 210.

According to aspects herein, the wheel 10 according to the present disclosure may further include one or more nut members. More specifically, as illustrated in FIGS. 2 and 3, the wheel 10 according to the present disclosure may further include: first nut members 610 coupled to the first rotary shaft 310; a second nut member 620 coupled to the second rotary shaft 320, and a third nut member 630 coupled to the third rotary shaft 330. The first to third nut members 610, 620, and 630 may be coupled to the first to third rotary shafts 310, 320, and 330, respectively, in a bolt-nut coupling manner.

The first nut members 610 (e.g., an upper first nut member and a lower first nut member as shown in FIGS. 2-3) may be provided on each of both sides of the body unit 100 in the width direction W of the body unit 100. The upper first nut member may be attached to the first bearing inner race 512 and/or the first bearing outer race 514. The second nut member 620 may be provided outward from the first link member 210 in the width direction W. The third nut member 630 may face the second link member 220 with the body unit 100 therebetween in the width direction W.

The first nut members 610, second nut member 620, and third nut member 630 may be configured to stably couple the first rotary shaft 310, the second rotary shaft 320 and the third rotary shaft 330, respectively, to the first link member 210 and/or the second link member 220.

Referring now to FIG. 5, the body unit 100 may be divided into a plurality of regions. However, the plurality of regions, does not necessarily indicate that the plurality of regions are made of different materials. Rather, all regions of the body unit may be made of the same material.

More specifically, the body unit 100 may include an inner region 110 that forms the inside of the body unit 100 in the radial direction R. The body unit 100 may further include an outer region 120 which may be spaced outward from the inner region 110 in the radial direction R and may form the outside of the body unit 100. The body unit 100 may further include a plurality of spokes in a spoke region 130 which may connect the inner region 110 and the outer region 120. Each of the inner region 110 and the outer region 120 may have a ring shape.

According to the present disclosure, the first body through-hole H1 (described above) may be formed in the inner region 110, and the second body through-hole H2 (described above) may be formed in the outer region 120. Therefore, the first rotary shaft 310 may be inserted into the inner region 110, and the third rotary shaft 330 may be inserted into the outer region 120.

According to aspects, the spoke region 130 may include a plurality of spokes along the circumferential direction C of the body unit 100. According to aspects, the plurality of spokes of the spoke region 130 may be equidistantly spaced apart from each other in the circumferential direction C. FIG. 5 or the like illustrates, as one example, that each spoke of the spoke region 130 may have a shape which is biased in the circumferential direction C toward the outside of the radial direction R of the body unit 100. This may be understood as indicating that the plurality of spokes of the spoke region 130 may have a shape that is curved in one direction.

According to aspects, the body unit 100 may further include a reinforcement region 140 which may be provided between the inner region 110 and the outer region 120 in the radial direction R and connect the plurality of spokes of the spoke region regions 130. Similar to the inner region 110 and the outer region 120, the reinforcement region 140 may have a ring shape.

Referring to FIG. 1, when an external force is not applied to the wheel 10, that is, in a state in which the shape of the body unit 100 is not deformed, a certain angle may be formed between a longitudinal direction of the first link member 210 and a longitudinal direction of the second link member 220 in the region in which the first link member 210 is coupled to the second link member 220. Thus, in the present concept each of the first link member 210 and the second link member 220 may not be located in parallel with the radial direction R. This may assist in accomplishing the following. When an external force is applied to the body unit 100 in the radial direction R while the wheel 10 travels, the directions in which the forces are applied to the first link member 210 and the second link member 220, and the directions in which the first link member 210 and the second link member 220 extend, are not parallel to each other but form a certain angle. Therefore, the first link member 210 and the second link member 220 may be allowed to rotate and rapidly cope with the deformation of the body unit 100.

Hereinafter, a mobile apparatus according to the present disclosure will be described. The above descriptions of the wheel according to the present disclosure may be applied in the same manner to a wheel provided in a mobility which will be described later.

A mobile apparatus according to the present disclosure may include a wheel 10 and a frame to which the wheel may be coupled.

According to aspects, the wheel 10 may include a body unit 100 including a material of which a shape is reversibly deformable. the wheel may further include a first link member 210 rotatably coupled to the body unit 100, and a second link member 220 having one side rotatably coupled to the first link member 210 and the other side rotatably coupled to the body unit 100. A first rotary shaft 310 may be provided in a region of the body unit, in which the first link member 210 is rotatably coupled to the body unit 100, and inserted into the first link member 210 and the body unit 100. A second rotary shaft 320 may be provided in a region of the body unit in which the second link member 220 is rotatably coupled to the first link member 210, and inserted into the first link member 210 and the second link member 220. Additionally, a third rotary shaft 330 may be provided in a region of the body unit in which the second link member 220 is rotatably coupled to the body unit 100, and inserted into the second link member 220 and the body unit 100.

According to the present disclosure, the first link member 210 and the second link member 220 may be provided adjacent to one side surface, facing the frame, among both the side surfaces of the body unit 100 in a width direction W. Such an arrangement may prevent the first link member 210 and the second link member 220 from being exposed to the outside of the mobile apparatus.

A first aspect of the present disclosure provides a wheel including: a body unit including a material of which a shape is reversibly deformable; a first link member rotatably coupled to the body unit; a second link member having one side rotatably coupled to the first link member and the other side rotatably coupled to the body unit; a first rotary shaft provided in a region, in which the first link member is rotatably coupled to the body unit, and inserted into the first link member and the body unit; a second rotary shaft provided in a region, in which the second link member is rotatably coupled to the first link member, and inserted into the first link member and the second link member; and a third rotary shaft provided in a region, in which the second link member is rotatably coupled to the body unit, and inserted into the second link member and the body unit.

The first rotary shaft may be provided inward from the second rotary shaft in a radial direction (R) of the body unit.

The second rotary shaft may be provided inward from the third rotary shaft in the radial direction (R).

The first rotary shaft, the second rotary shaft, and the third rotary shaft may be provided in parallel to each other.

The first link member and the second link member may be spaced apart from the body unit in a width direction (W) of the body unit.

A distance between the first link member and the body unit may be greater than a distance between the second link member and the body unit.

In a region, in which the second rotary shaft passes through the first link member and the second link member, the first link member may be inserted into the second link member.

In a region, in which the second rotary shaft passes through the first link member and the second link member, the second link member may be inserted into the first link member.

A first body through-hole, which the first rotary shaft is inserted into and coupled to, may be formed in the body unit, and the wheel may further include a first spacer which is inserted into and coupled to the first body through-hole to accommodate the first rotary shaft.

A second body through-hole, which the third rotary shaft is inserted into and coupled to, may be formed in the body unit, and the wheel may further include a second spacer which is inserted into and coupled to the second body through-hole to accommodate the third rotary shaft.

The wheel may further include a first bearing which is provided in a region, in which the first rotary shaft passes through the first link member, and accommodated inside the first link member, and the first rotary shaft may pass through the first bearing.

The wheel may further include a second bearing which is provided in a region, in which the second rotary shaft passes through the first link member, and accommodated inside the first link member, and the second rotary shaft may pass through the second bearing.

The first bearing may include: a first bearing inner race coupled and fixed to the first rotary shaft; and a first bearing outer race which is provided on the outside of the first bearing inner race and coupled and fixed to the first link member.

The wheel may further include a first nut member coupled to the first rotary shaft, wherein the first nut member is provided on each of both sides of the body unit in a width direction (W) of the body unit.

The wheel may further include a second nut member coupled to the second rotary shaft, wherein the second nut member is provided outward from the first link member in the width direction (W).

The wheel may further include a third nut member coupled to the third rotary shaft, wherein the third nut member faces the second link member with the body unit therebetween in the width direction (W).

The body unit may include: an inner region that forms the inside of the body unit in a radial direction (R); an outer region which is spaced outward from the inner region in the radial direction (R) and forms the outside of the body unit; and a spoke region configured to connect the inner region to the outer region, wherein the first rotary shaft is inserted into the inner region, and the third rotary shaft is inserted into the outer region.

The spoke region may be provided in plurality along a circumferential direction (C) of the body unit, and each of the spoke regions may have a shape which is biased in the circumferential direction (C) toward the outside of the radial direction (R) of the body unit.

In the region, in which the first link member is coupled to the second link member, a certain angle may be formed between a longitudinal direction of the first link member and a longitudinal direction of the second link member.

A second aspect of the present disclosure provides a mobility (e.g., mobile apparatus) including a wheel and a frame to which the wheel is coupled, wherein the wheel includes: a body unit including a material of which a shape is reversibly deformable; a first link member rotatably coupled to the body unit; a second link member having one side rotatably coupled to the first link member and the other side rotatably coupled to the body unit; a first rotary shaft provided in a region, in which the first link member is rotatably coupled to the body unit, and inserted into the first link member and the body unit; a second rotary shaft provided in a region, in which the second link member is rotatably coupled to the first link member, and inserted into the first link member and the second link member; and a third rotary shaft provided in a region, in which the second link member is rotatably coupled to the body unit, and inserted into the second link member and the body unit.

According to the present disclosure, the twisting phenomena of the wheel may be minimized even during the turning motion of the wheel. Thus, the durability of the wheel may be enhanced, and the traveling performance of the mobile apparatus to which the wheels are mounted may be enhanced.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A wheel comprising:
a body comprising a material of which a shape is reversibly deformable;
a first link rotatably coupled to the body;
a second link having one side rotatably coupled to the first link and the other side rotatably coupled to the body;
a first shaft disposed in a region, in which the first link is rotatably coupled to the body, and inserted into the first link and the body;
a second shaft disposed in a region, in which the second link is rotatably coupled to the first link, and inserted into the first link and the second link;
a third shaft disposed in a region, in which the second link is rotatably coupled to the body, and inserted into the second link and the body; and
a first bearing disposed in the first link in a region, in which the first shaft passes through the first link,
wherein the first shaft passes through the first bearing, and wherein the first bearing comprises:
a first bearing inner race coupled to the first shaft; and
a first bearing outer race disposed on an outside of the first bearing inner race and coupled to the first link.

2. The wheel of claim 1, wherein the first shaft is provided inward from the second shaft in a radial direction of the body.

3. The wheel of claim 2, wherein the second shaft is provided inward from the third shaft in the radial direction.

4. The wheel of claim 1, wherein the first shaft, the second shaft, and the third shaft are provided in parallel to each other.

5. The wheel of claim 1, wherein the first link and the second link are spaced apart from the body in a width direction of the body.

6. The wheel of claim 1, wherein a distance between the first link and the body is greater than a distance between the second link and the body.

7. The wheel of claim 1, wherein in a region, in which the second shaft passes through the first link and the second link, the first link is inserted into the second link.

8. The wheel of claim 1, wherein in a region, in which the second shaft passes through the first link and the second link, the second link is inserted into the first link.

9. The wheel of claim 1, wherein the first shaft is inserted into a first body through-hole formed in the body, and
wherein the wheel further comprises a first spacer which is inserted into the first body through-hole to accommodate the first shaft.

10. The wheel of claim 9, wherein the third shaft is inserted into a second body through-hole formed in the body, and
wherein the wheel further comprises a second spacer which is inserted into the second body through-hole to accommodate the third shaft.

11. The wheel of claim 1, further comprising a second bearing disposed in the first link in a region, in which the second shaft passes through the first link, and
wherein the second shaft passes through the second bearing.

12. The wheel of claim 1, further comprising a nut coupled to the first shaft,
wherein the nut is disposed on a side of the body in a width direction of the body.

13. The wheel of claim 1, further comprising a nut coupled to the second shaft,
wherein the nut is disposed outward from the first link.

14. The wheel of claim 1, further comprising a nut coupled to the third shaft,
wherein the nut faces the second link with the body therebetween in a width direction.

15. The wheel of claim 1, wherein the body comprises:
an inner region that forms an inside of the body in a radial direction;
an outer region which is spaced outward from the inner region in the radial direction and forms an outside of the body; and a spoke region configured to connect the inner region to the outer region, wherein the first shaft is inserted into the inner region, and the third shaft is inserted into the outer region.

16. The wheel of claim 15, wherein the spoke region comprises a plurality of spokes along a circumferential direction of the body, and wherein each of the spokes has a shape which is biased in the circumferential direction toward the outside of the body in the radial direction.

17. The wheel of claim 1, wherein an angle is formed between a longitudinal direction of the first link and a longitudinal direction of the second link, and wherein the longitudinal direction of the first link and the longitudinal direction of the second link are non-parallel.

18. The wheel of claim 1, further comprising:

a second bearing disposed in a region, in which the second shaft passes through the first link, wherein the second shaft passes through the second bearing.

19. A mobile apparatus comprising a wheel, wherein the wheel comprises:

a body of which shape is reversibly deformable;

a first link rotatably coupled to the body;

a second link, wherein a first side of the second link is rotatably coupled to the first link and a second side of the second link is rotatably coupled to the body;

a first shaft disposed in a region, in which the first link is rotatably coupled to the body, and inserted into the first link and the body;

a second shaft disposed in a region, in which the second link is rotatably coupled to the first link, and inserted into the first link and the second link;

a third shaft disposed in a region, in which the second link is rotatably coupled to the body, and inserted into the second link and the body; and a first bearing disposed in the first link in a region, in which the first shaft passes through the first link, wherein the first shaft passes through the first bearing, and wherein the first bearing comprises:

a first bearing inner race coupled to the first shaft; and a first bearing outer race disposed on an outside of the first bearing inner race and coupled to the first link.

20. The mobile apparatus of claim 19, wherein the wheel further comprises a second bearing disposed in a region, in which the second shaft passes through the first link, wherein the second shaft passes through the second bearing, wherein the second bearing comprises:

a second bearing inner race coupled to the second shaft; and a second bearing outer race disposed on an outside of the second bearing inner race and coupled to the first link.

* * * * *